(12) United States Patent
Newiger (10) Patent No.: US 9,986,136 B2
(45) Date of Patent: May 29, 2018

(54) VEHICLE CAMERA WITH SINGLE POINT IMAGER FIXATION TO LENS HOLDER

(71) Applicant: MAGNA ELECTRONICS INC., Auburn Hills, MI (US)

(72) Inventor: Achim Newiger, Aschaffenburg (DE)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 0 days. days.

(21) Appl. No.: 15/334,366

(22) Filed: Oct. 26, 2016

(65) Prior Publication Data

US 2017/0126938 A1 May 4, 2017

Related U.S. Application Data

(60) Provisional application No. 62/267,324, filed on Dec. 15, 2015, provisional application No. 62/248,670, filed on Oct. 30, 2015.

(51) Int. Cl.
| | |
|---|---|
| *H04N 5/225* | (2006.01) |
| *H04N 7/18* | (2006.01) |
| *H04N 5/232* | (2006.01) |
| *B60R 1/00* | (2006.01) |
| *G02B 7/02* | (2006.01) |
| *H04N 5/374* | (2011.01) |

(52) U.S. Cl.
CPC ............ *H04N 5/2252* (2013.01); *B60R 1/00* (2013.01); *G02B 7/025* (2013.01); *H04N 5/2253* (2013.01); *H04N 5/2254* (2013.01); *H04N 7/183* (2013.01); *B60R 2300/105* (2013.01); *B60R 2300/30* (2013.01); *B60R 2300/802* (2013.01); *H04N 5/23293* (2013.01); *H04N 5/374* (2013.01)

(58) Field of Classification Search
CPC .. H04N 5/2252; H04N 5/2253; H04N 5/2254; H04N 5/2257; B60R 2300/00; B60R 2300/10; B60R 2300/105; B60R 2300/802; B60R 2300/8026
See application file for complete search history.

(56) References Cited

U.S. PATENT DOCUMENTS

| | | |
|---|---|---|
| 4,634,884 A | 1/1987 | Hayashimoto et al. |
| 5,550,677 A | 8/1996 | Schofield et al. |
| 5,670,935 A | 9/1997 | Schofield et al. |
| 5,949,331 A | 9/1999 | Schofield et al. |
| 6,326,613 B1 | 12/2001 | Heslin et al. |

(Continued)

*Primary Examiner* — Paul Berardesca
(74) *Attorney, Agent, or Firm* — Honigman Miller Schwartz and Cohn, LLP (57) ABSTRACT

A vision system of a vehicle includes a camera having a front housing portion and a circuit element having an imager disposed thereat. One of the front housing portion and the circuit element includes a protrusion protruding therefrom and the other of the front housing portion and the circuit element includes a receiving portion for at least partially receiving the protrusion when the circuit element is positioned at the front housing portion to align the imager with the lens. When the circuit element is positioned at the front housing portion to align the imager with the lens, the protrusion is at least partially received at the receiving portion and is attached thereat, and no other part of the lens holder is attached at the circuit element when the circuit element is positioned at the front housing portion to align the imager with the lens.

18 Claims, 8 Drawing Sheets

(56) References Cited

U.S. PATENT DOCUMENTS

| | | |
|---|---|---|
| 6,824,281 B2 | 11/2004 | Schofield et al. |
| 7,480,149 B2 | 1/2009 | DeWard et al. |
| 8,542,451 B2 | 9/2013 | Lu et al. |
| 9,233,641 B2 | 1/2016 | Sesti et al. |
| 2005/0285973 A1* | 12/2005 | Singh ................ H01L 27/14618 348/374 |
| 2006/0050018 A1 | 3/2006 | Hutzel et al. |
| 2009/0295181 A1 | 12/2009 | Lawlor et al. |
| 2010/0097519 A1* | 4/2010 | Byrne ....................... B60R 1/00 348/373 |
| 2013/0242099 A1 | 9/2013 | Sauer et al. |
| 2014/0160284 A1 | 6/2014 | Achenbach et al. |
| 2014/0298642 A1 | 10/2014 | Sesti et al. |
| 2014/0313337 A1 | 10/2014 | Devota et al. |
| 2014/0362285 A1* | 12/2014 | Min ....................... G02B 7/005 348/374 |
| 2014/0373345 A1 | 12/2014 | Steigerwald |
| 2015/0124098 A1 | 5/2015 | Winden et al. |
| 2015/0222795 A1 | 8/2015 | Sauer et al. |
| 2015/0266430 A1 | 9/2015 | Mleczko et al. |
| 2015/0365569 A1 | 12/2015 | Mai et al. |
| 2016/0037028 A1 | 2/2016 | Biemer |
| 2016/0268716 A1 | 9/2016 | Conger et al. |
| 2017/0012069 A1* | 1/2017 | Rudmann ......... H01L 27/14618 |
| 2017/0133811 A1 | 5/2017 | Conger et al. |
| 2017/0201661 A1 | 7/2017 | Conger et al. |

\* cited by examiner

VEHICLE CAMERA WITH SINGLE POINT IMAGER FIXATION TO LENS HOLDER

CROSS REFERENCE TO RELATED APPLICATIONS

The present application claims the filing benefits of U.S. provisional application Ser. No. 62/267,324, filed Dec. 15, 2015, and U.S. provisional application Ser. No. 62/248,670, filed Oct. 30, 2015, which are hereby incorporated herein by reference in their entireties.

FIELD OF THE INVENTION

The present invention relates generally to a vehicle vision system for a vehicle and, more particularly, to a vehicle vision system that utilizes one or more cameras at a vehicle.

BACKGROUND OF THE INVENTION

Use of imaging sensors in vehicle imaging systems is common and known.

Examples of such known systems are described in U.S. Pat. Nos. 5,949,331; 5,670,935 and/or 5,550,677, which are hereby incorporated herein by reference in their entireties.

SUMMARY OF THE INVENTION

The present invention provides a driver assistance system or vision system or imaging system for a vehicle that utilizes one or more cameras (preferably one or more CMOS cameras) to capture image data representative of images exterior of the vehicle, and provides a camera assembly that has a lens holder (that holds or supports a lens or lens assembly comprising one or more, such as a plurality of, optical elements) and a circuit element or printed circuit board (PCB) that has an imager and associated circuitry disposed thereat. The PCB is affixed relative to the lens holder via a single fixation or attachment location. For example, the lens holder may comprise a post or protrusion extending therefrom, and the PCB may have an aperture or structure for receiving or otherwise engaging the lens holder protrusion when the lens holder and PCB are assembled together, and whereby the protrusion and structure are adhesively bonded together to secure the PCB relative to the lens holder and thus to secure the imager relative to and aligned with the lens.

These and other objects, advantages, purposes and features of the present invention will become apparent upon review of the following specification in conjunction with the drawings.

BRIEF DESCRIPTION OF THE DRAWINGS

FIGS. 6 and 7 show the bending of a PCB over a temperature range of −40 degrees C. to +80 degrees C. fixated on four fixation points, with the distance and the focus to the lens system varying by that;

DESCRIPTION OF THE PREFERRED EMBODIMENTS

A vehicle vision system and/or driver assist system and/or object detection system and/or alert system operates to capture images exterior of the vehicle and may process the captured image data to display images and to detect objects at or near the vehicle and in the predicted path of the vehicle, such as to assist a driver of the vehicle in maneuvering the vehicle in a rearward direction. The vision system includes an image processor or image processing system that is operable to receive image data from one or more cameras and provide an output to a display device for displaying images representative of the captured image data. Optionally, the vision system may provide display, such as a rearview display or a top down or bird's eye or surround view display or the like.

Figure 1:
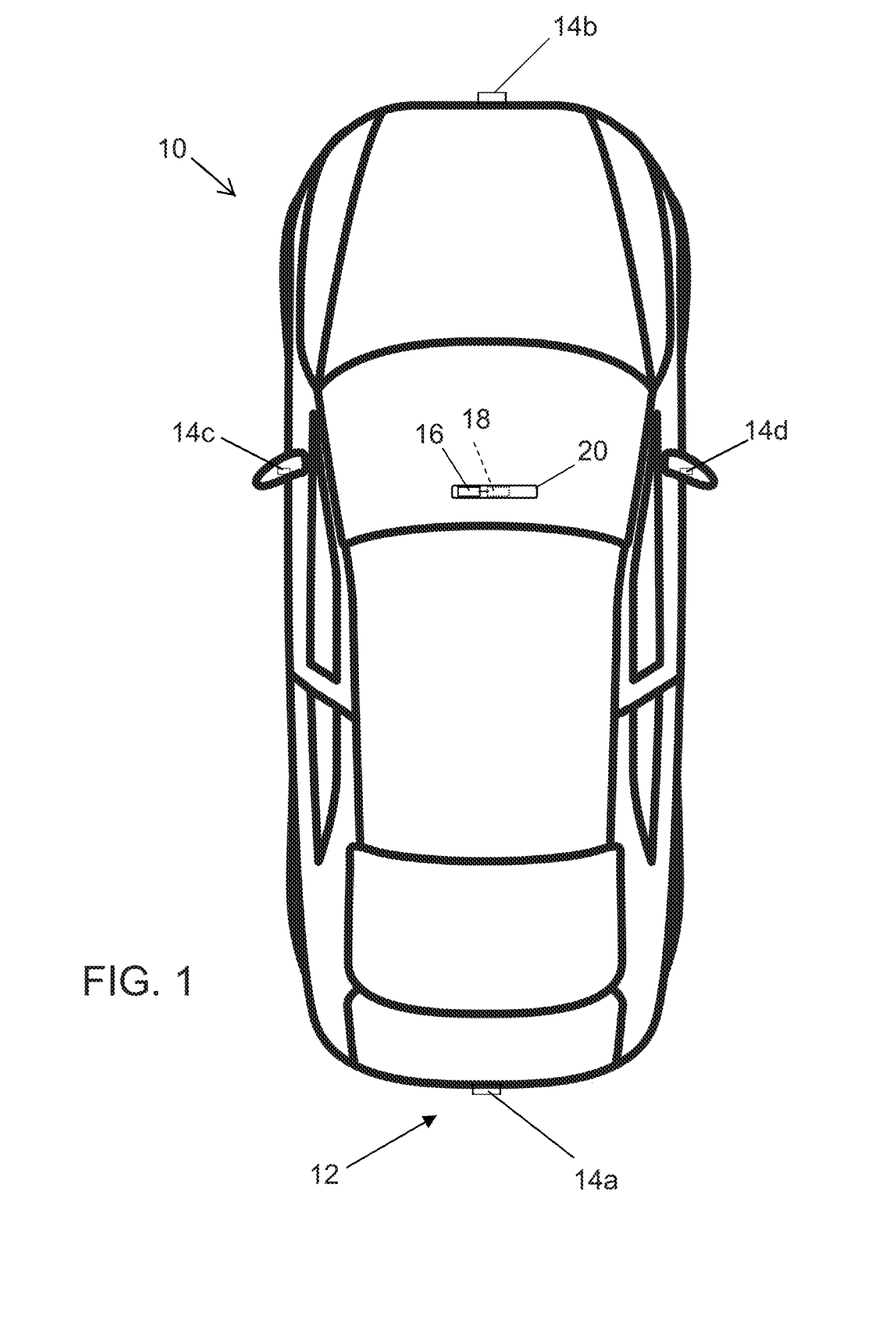
FIG. 1 is a plan view of a vehicle with a vision system that incorporates cameras in accordance with the present invention.

Referring now to the drawings and the illustrative embodiments depicted therein, a vehicle 10 includes an imaging system or vision system 12 that includes at least one exterior facing imaging sensor or camera, such as a rearward facing imaging sensor or camera 14*a* (and the system may optionally include multiple exterior facing imaging sensors or cameras, such as a forwardly facing camera 14*b* at the front (or at the windshield) of the vehicle, and a sidewardly/rearwardly facing camera 14*c*, 14*d* at respective sides of the vehicle), which captures images exterior of the vehicle, with the camera having a lens for focusing images at or onto an imaging array or imaging plane or imager of the camera (FIG. 1). Optionally, a forward viewing camera may be disposed at the windshield of the vehicle and view through the windshield and forward of the vehicle, such as for a machine vision system (such as for traffic sign recognition, headlamp control, pedestrian detection, collision avoidance, lane marker detection and/or the like). The vision system 12 includes a control or electronic control unit (ECU) or processor 18 that is operable to process image data captured by the camera or cameras and may detect objects or the like and/or provide displayed images at a display device 16 for viewing by the driver of the vehicle (although shown in FIG. 1 as being part of or incorporated in or at an interior rearview mirror assembly 20 of the vehicle, the control and/or the display device may be disposed elsewhere at or in the vehicle). The data transfer or signal communication from the camera to the ECU may comprise any suitable data or communication link, such as a vehicle network bus or the like of the equipped vehicle.

Figure 4:
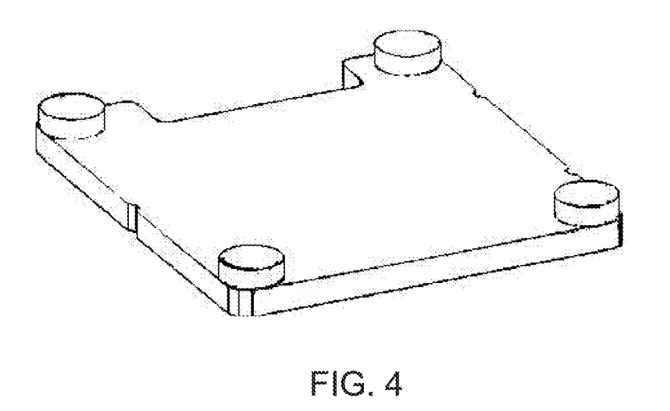
FIG. 4 is a perspective view of a circuit board having four adhesive dots for adhesively attaching at a lens holder at four locations.

An imager carrying printed circuit board (PCB) may be adhesively attached to the lens holder structure. The PCB is held in an aligned position while four one sided glue points (see FIG. 4) facing to the lens holder get cured by ultra violet light, shining onto the glue points from a respective side of the assembly (such as by utilizing aspects of the cameras and systems described in U.S. Publication No. US-2014-0298642, which is hereby incorporated herein by reference in its entirety). The imager—lens holder alignment is necessary for receiving a sharp image on the imager. This is done automatically during camera assembly and requires high precision.

Figure 5:
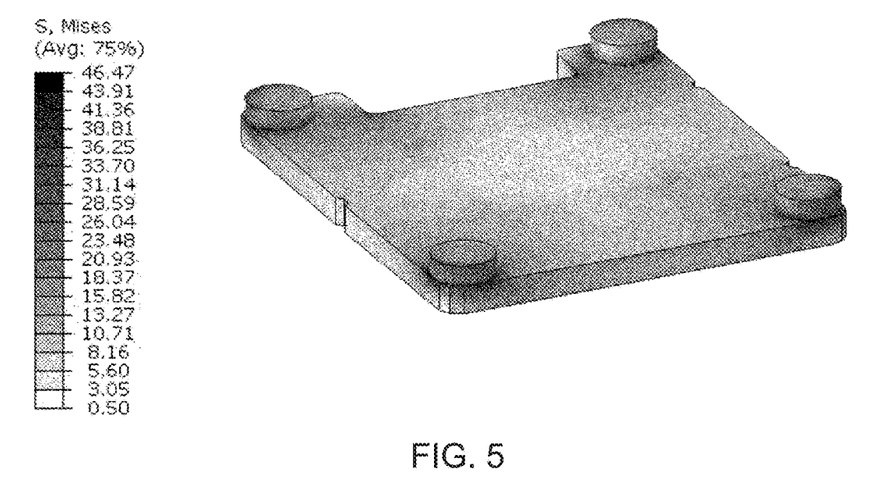
FIG. 5 is another perspective view of the circuit board of FIG. 4, showing simulated stress regions caused by different coefficients of thermal expansion of the PCB material and the lens holder material when the circuit board is attached at four locations.
Figure 6:
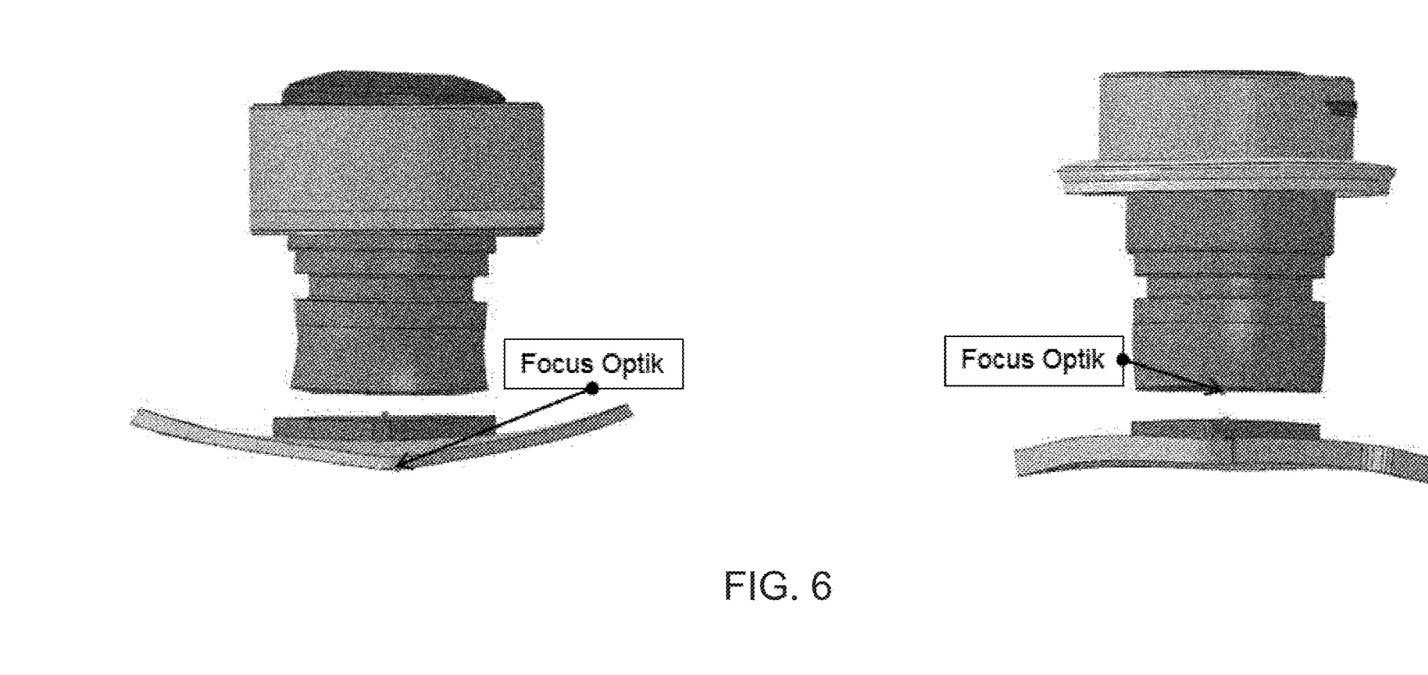
Figure 7:
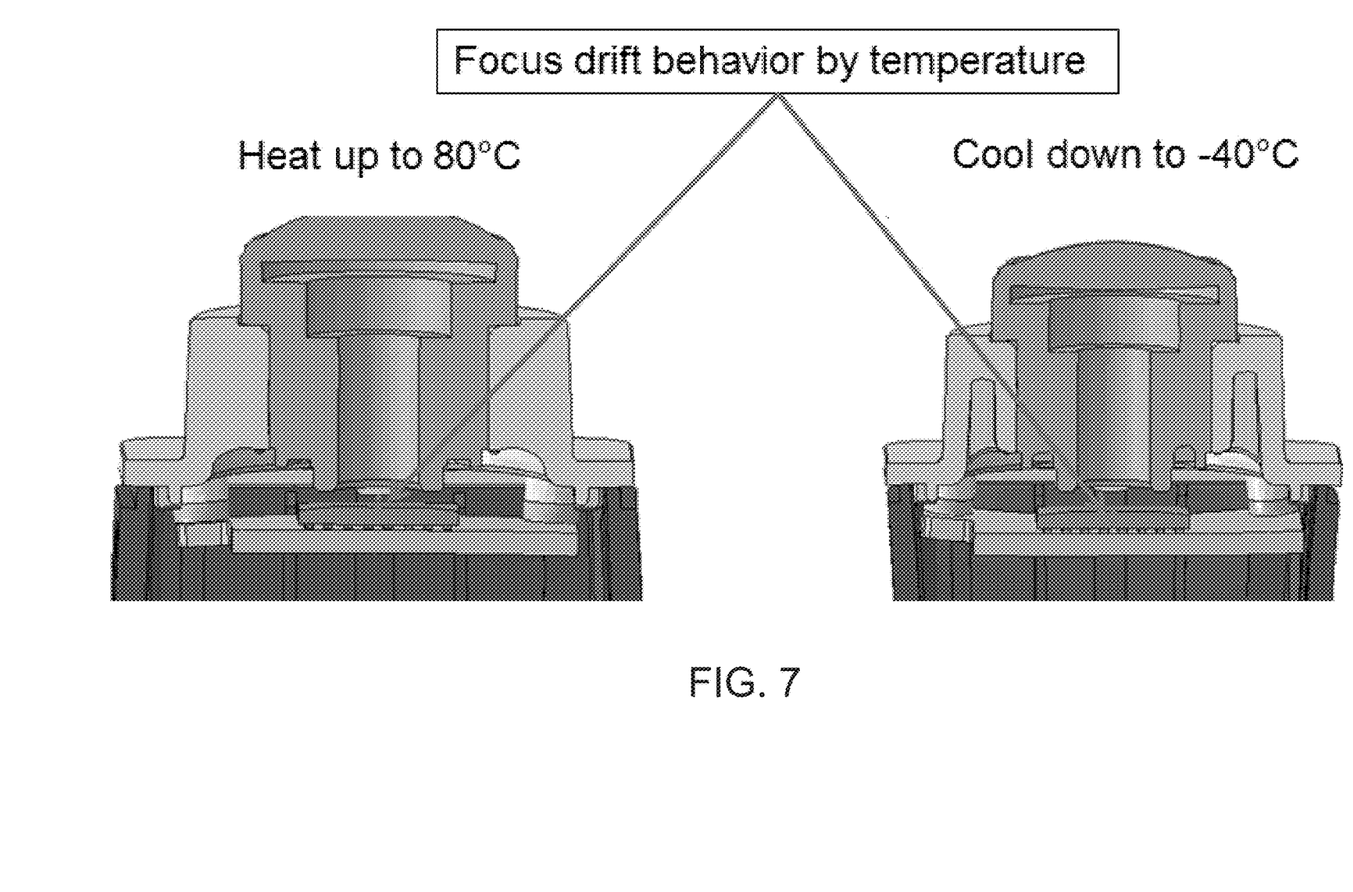
Figure 8:
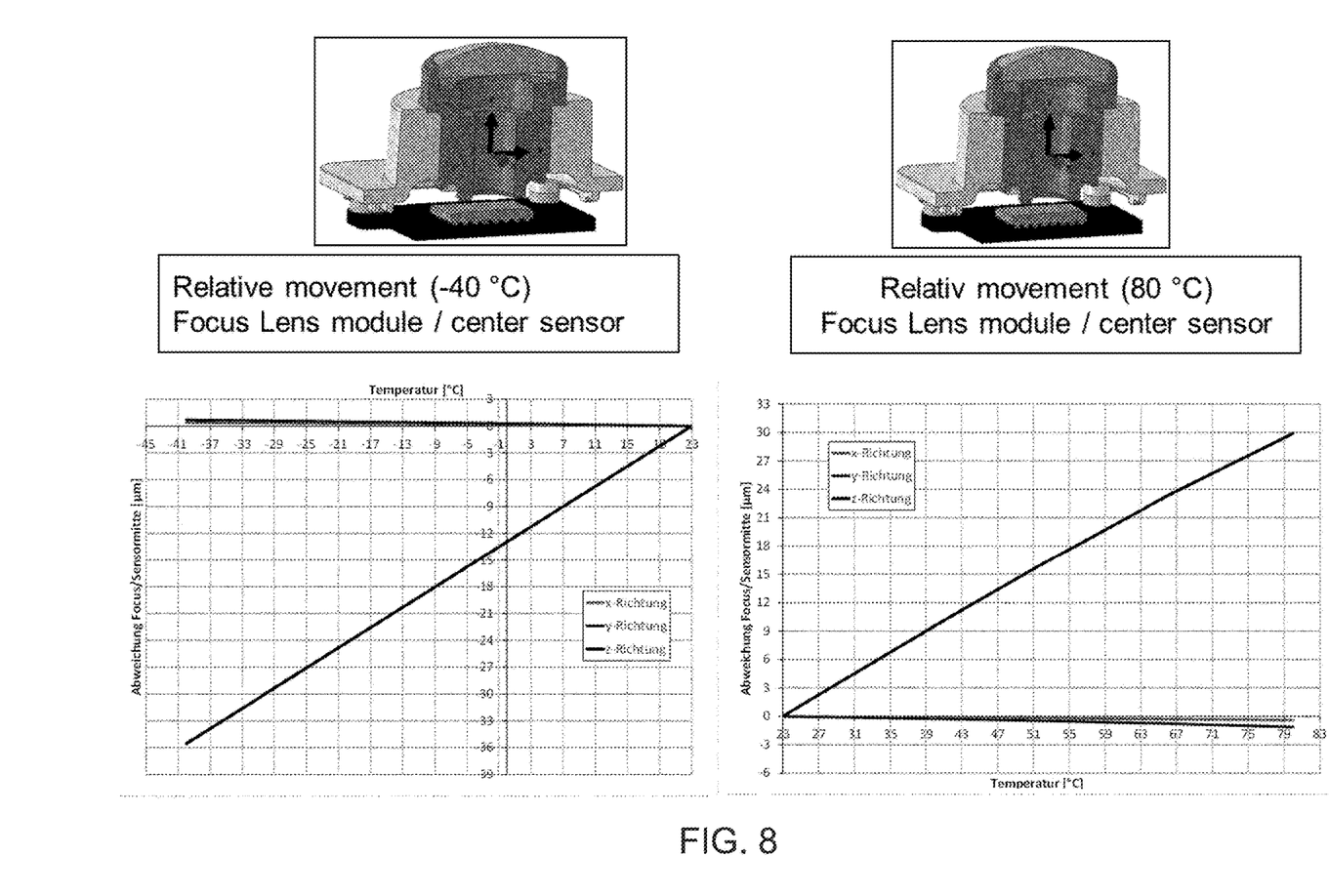
FIG. 8 shows a diagram of the bending of a PCB over a temperature range of −40 degrees C. to +80 degrees C. fixated on the four fixation points shown in FIGS. 6 and 7.

Such a method may have two issues: The curing from a side requires some space for letting the light pass. Additionally, due to fixing the PCB at more than one point, mechanical stress to the whole camera lens holder system and the PCB itself (see FIG. 5) can occur during vehicle installed operation or on test, due to different coefficients of thermal expansion of the PCB material (glass fibers and resin) and the lens holder material such as PBT-PC (such as, for example, GF20 or the like), and other plastics, eventually glass or carbon fiber reinforced, Aluminum or die cast. A result of the mechanical deformation of a PCB attached on more than 1 point is focus drift of a per se correctly assembled imager. FIGS. 6 and 7 show the convex are respectively concave bending of the PCB as a result of temperature bending of the PCB, which causes the imager to be delocalized from the ideal focus plane. FIG. 8 shows a simulation of the focus misalignment, which is expressed in the Z-direction.

Figure 9:
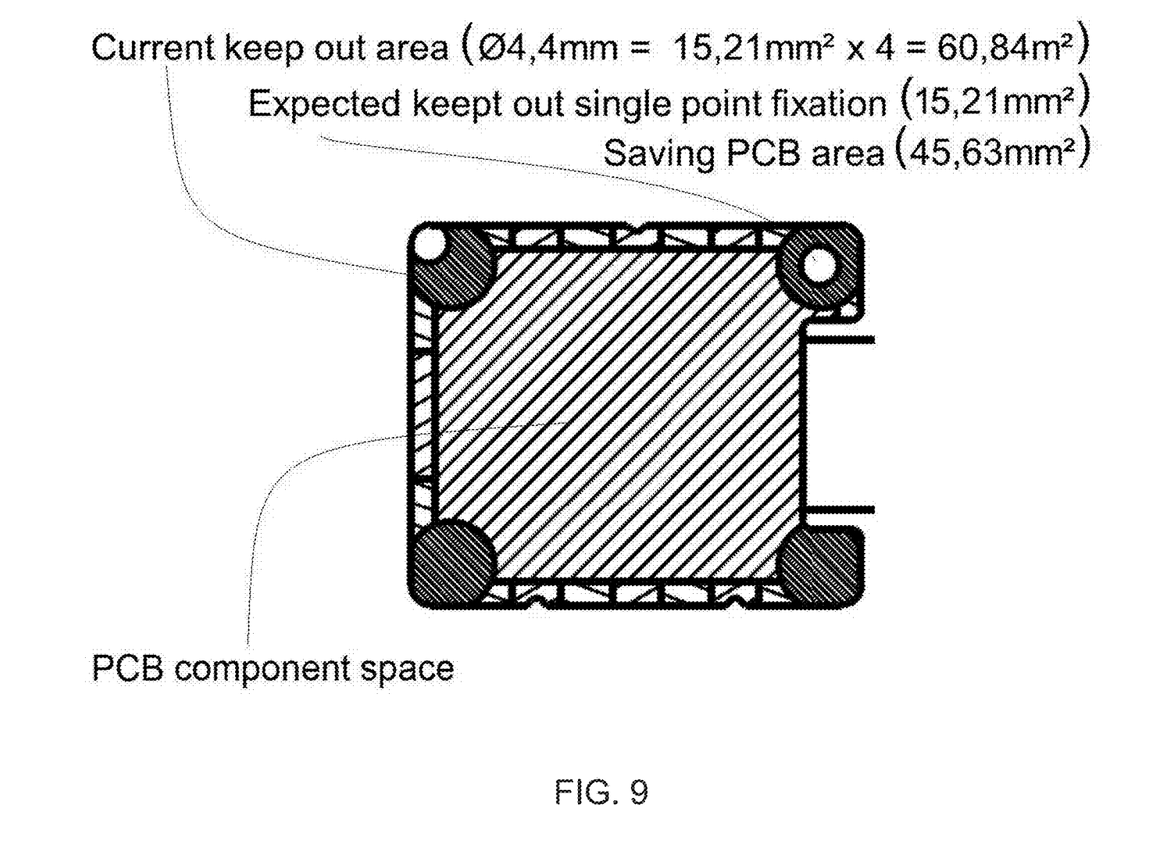
FIG. 9 is a schematic of a top view onto the space distribution in a camera housing having just one PCB fixation according to the present invention as compared to having conventional four fixations.

When only one fixation point is used, the mechanical stress due to temperature expansion does not occur. It has been found that one fixation point, such as shown in the example of FIG. 9, can hold the occurring acceleration forces to the PCB during normal operation and test conditions, since the imager PCB is comparably light and the lever arms are comparably short. Vibration may be in an acceptable range or may be limited by optionally assembling an additional damper between the far edge of the imager PCB and the lens holder or camera rear housing. The dampening element may optionally comprise a sponge or cushion like foam or elastic rubber or an elastic paste or gel which is temperature stable within the required or desired temperature band of −40 degrees C. to +80 degrees C. (or higher when required).

Optionally, another aspect of the present invention may be to instead have surfaces of the PCB glued to a surface of the lens holder for fixation, the imager PCB may have a hole instead. The adhesive or glue may be applied through the hole or earlier onto the lens holder portion that the hole is facing. The adhesive may expand or swell through the hole when the PCB is moved to the lens holder which is pressing onto the glue drop. The adhesive may than be cured by ultra violet light, by heat or by both (such as by using aspects of the cameras described in U.S. Pat. No. 8,542,451 and U.S. Publication No. US-2014-0298642, which are hereby incorporated herein by reference in their entireties). Since the adhesive may be directly accessible through the hole there will be no more need for having extra space at the side or sides of the PCB for letting light pass. The adhesive or glue drop may cure in a mushroom shape manner, which will make it the PCB nearly or substantially impossible to slip off. As another aspect of the present invention, the fixation point glue through hole may have a non-circled shape such as being done as an oblong hole, oval, cross, triangle, rectangle, hexagon, octagon, star shape or the like, to limit or prevent the PCB from rotating or turning around the through hole fixation point due to test or operation forces such as like shock or vibration. Optionally, there may be a pin or post like structure formed out of the lens holder material or extra pointing into the direction of the PCB's fixation hole (see FIG. 3). Optionally, the post may be hollow to allow the glue to dispense in partially which may hold the glue in place before being cured during the alignment process. Optionally, the length of the single post may be selected or adjusted to move the PCB (and imager) closer to or farther away from the lens. Using the one point fixation solution described above may increase the focus capability over the required temperature range of −40 degrees C. to +80 degrees C. (or higher). The diagram of FIG. 8 may then come out more flat, especially in the z-direction. Due to the lower temperature expansion varying (space wise), the camera may be built smaller in the area between the lens and imager since less tolerance space needs to be designed in that region. Taking away three of the typical four fixation points additionally frees up important PCB space. The adhesive or glue quantity is reduced by the reduction of fixation points as well. Additionally, the overall fixation cycle time may be diminished by the reduction of fixation points.

Figures 2, 3:
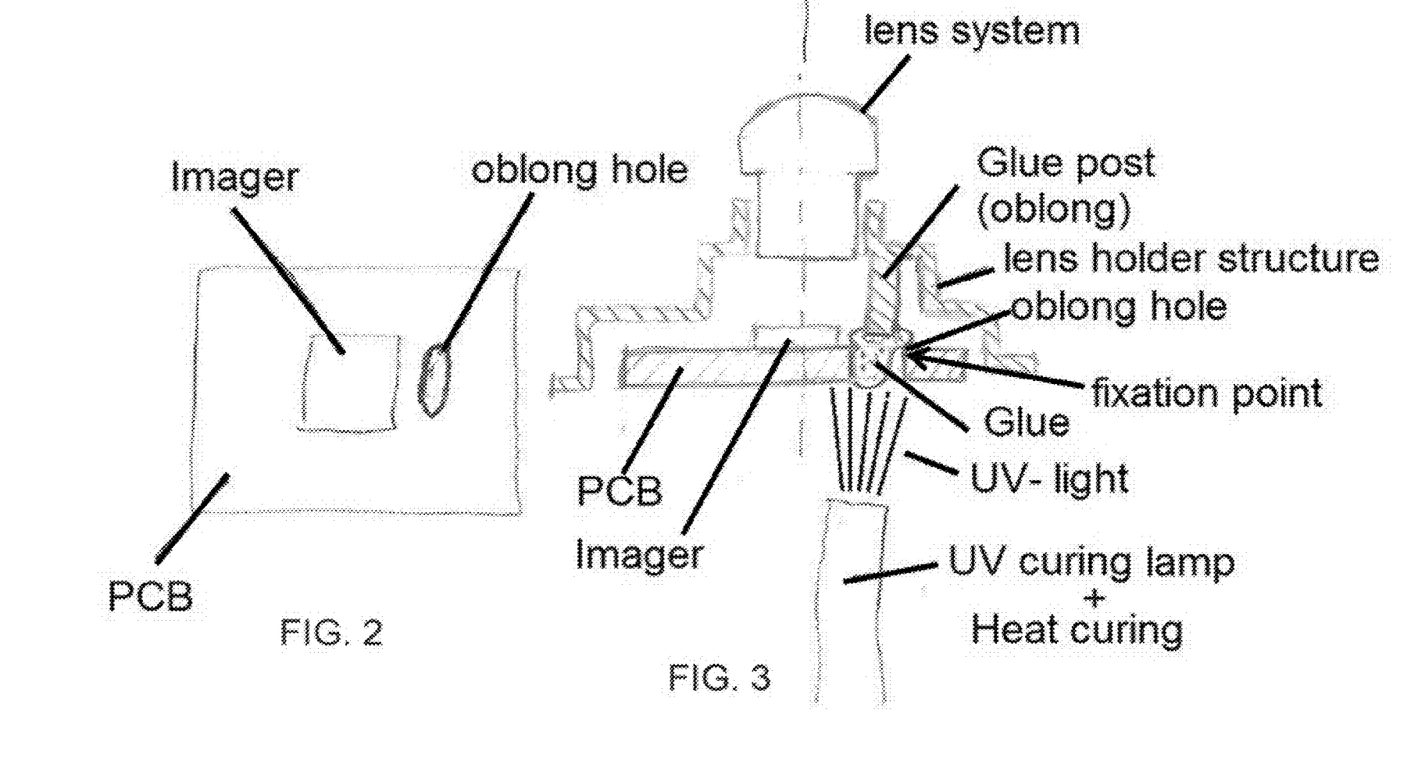
FIG. 2 is a plan view of a circuit element or board with an imager disposed thereat.
FIG. 3 is a side elevation and partial sectional view of a camera with the lens holder affixed at the circuit board via a single attachment post.
Figure 10:
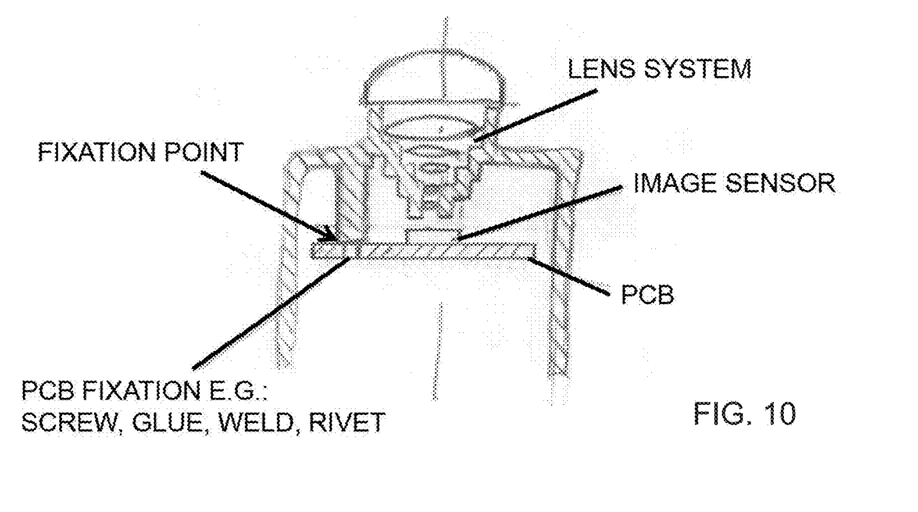
FIG. 10 shows a cross section of a camera out of sintered aluminum with a single point PCB fixation.
Figure 11:
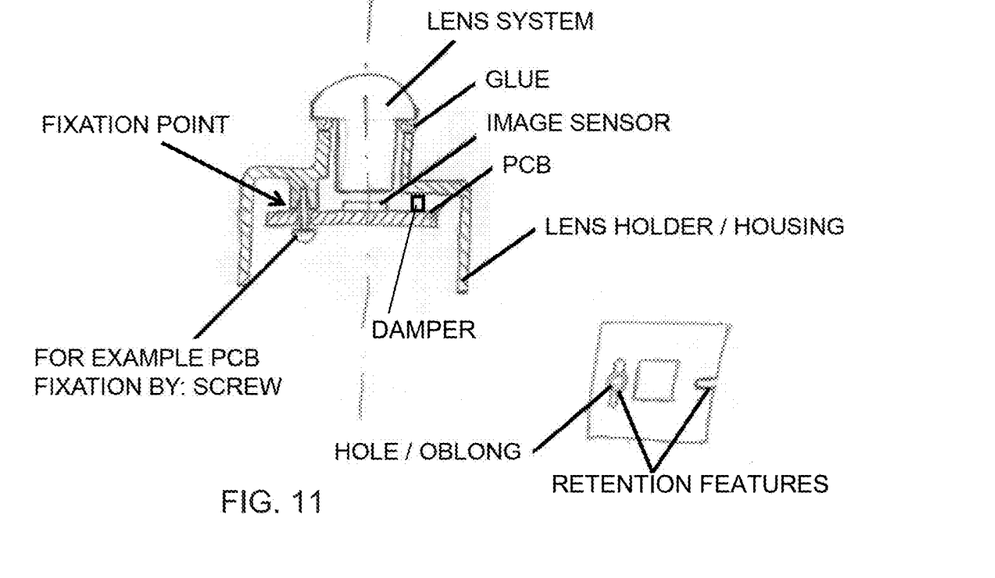
FIG. 11 shows a cross section of a camera with a deep drawn steel housing out of sintered aluminum with a single point attached PCB and retention features.

The lens holder structure of the camera in accordance with the present invention of FIG. 3 may comprise a conventional molded plastic. The lens holder structure may optionally be formed from a mold capable for being used for a Molded Interconnected Device (MID) process such as LCP—Vetra E840i LDS. The lens holder structure may optionally comprise sintered aluminum, such as shown in FIG. 10. The lens holder structure may optionally comprise a deep drawn, punched or embossed (also called minted) steel, such as shown in FIG. 11. For attaching the PCB at a single point there may be punched or sintered dome structures such as shown in FIGS. 10 and 11 within the inside of the lens holder structure. At both the plastic or the metal housing attachment structures, the PCB may be attached by sticking, gluing or curing (such as via UV curing) as discussed above or optionally by screwing in a plastic or metal screw (such as shown in FIG. 11), or optionally by riveting a metal or plastic rivet bolt, or optionally by inserting one or more self-locking clips. Alternatively, there may be the option that the housing structure's attachment dome may comprise a clip peeking out towards the attachment hole of the PCB at which the PCBs snaps in when being torn over the clip's dome. As shown in FIG. 11, the single point attached PCB may have retention features or anti-rotation features (that limit pivotal or rotational movement of the PCB about the single fixation point), such as a long hole at the attachment point and/or a gap which engages or receives a nose like matching extension within the camera housing's inside for holding the PCB and limiting or precluding pivoting or rotating or vibrating of the PCB around the single fixation point, especially when the fixation point is a screw (or a circular post in a circular aperture or the like).

Thus, the present invention provides a camera assembly that has a lens holder and a circuit element or printed circuit board (PCB) affixed or attached at the lens holder via a single attachment element or location or point, such that, when so attached, the imager of the PCB is aligned with the lens or lens assembly of the lens holder. The lens holder holds or supports the lens or lens assembly (comprising one or more, such as a plurality of, optical elements) to focus or image light at an imaging plane of the imager of the PCB (which may also have associated circuitry disposed thereat). The PCB is affixed relative to the lens holder via a single fixation or attachment location, such as via a post or protrusion extending from the lens holder and being received at or at least partially received at an aperture or structure of the PCB, whereby the protrusion is adhesively bonded at the PCB via curing of an adhesive (such as a UV curable adhesive or a thermal curable adhesive or the like). Optionally, the aperture through the PCB comprises a non-circular aperture and the post or protrusion of the lens holder has a non-circular shape, such that, when the protrusion is received (or partially received) at the aperture, the lens holder does not rotate relative to the PCB. The lens and imager thus may be aligned and adjusted along the optic axis of the lens relative to each other to establish the focal point of the lens at or near the imager, as desired. Optionally, the post or protrusion may protrude from the PCB and the receiving portion or aperture or passageway may be established at the lens holder, while remaining within the spirit and scope of the present invention.

Therefore, the camera and vision system of the present invention provides enhanced attachment of the printed circuit board at the front camera housing portion or lens holder. The single attachment point provides reduced or low stress in the complete camera system, with high focus stability over a wide temperature range. The single attachment also provides increased available space on the PCB surface. Optionally, a smaller and shorter camera is possible with the attachment point or process, which also requires less glue (e.g., adhesive only applied at single fixation location, instead of at four contact points of known cameras) to affix the PCB at the lens holder. Accessibility for UV- and heat curing is provided (such as shown in FIG. 3, where a UV curing lamp or heat curing element may access the PCB attachment or fixation point from the rear of the PCB and camera housing or lens holder before the rear camera housing portion is attached or mated with the front camera housing portion or lens holder), and a lower cycle time in production process may be achieved. After the PCB is affixed at the lens holder or front camera housing portion, the rear camera housing portion may be mated and adhered to or welded to the front camera housing portion, with electrical connection being made between circuitry of the PCB and an electrical connector or terminals at the rear housing portion.

The camera thus may include electrical connecting elements that accommodate tolerances in the housing and/or PCB mounting and/or connector portion. The electrical connecting elements may utilize aspects of the cameras and electrical connectors described in U.S. Pat. No. 9,233,641 and/or U.S. Publication Nos. US-2013-0242099; US-2014-0373345; US-2015-0222795; US-2015-0266430; US-2015-0365569; US-2016-0037028 and/or US-2016-0268716, and/or U.S. provisional application Ser. No. 62/251,243, filed Nov. 5, 2015, U.S. provisional application Ser. No. 62/313,278, filed Mar. 25, 2016, U.S. provisional application Ser. No. 62/319,953, filed Apr. 8, 2016, and/or U.S. provisional application Ser. No. 62/322,334, filed Apr. 14, 2016, which are hereby incorporated herein by reference in their entireties.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in International Publication Nos. WO 2013/081984 and/or WO 2013/081985, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an image processing chip selected from the EyeQ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ladar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 9,233,641; 9,146,898; 9,174,574; 9,090,234; 9,077,098; 8,818,042; 8,886,401; 9,077,962; 9,068,390; 9,140,789; 9,092,986; 9,205,776; 8,917,169; 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or International Publication Nos. WO 2011/028686; WO 2010/099416; WO 2012/061567; WO 2012/068331; WO 2012/075250; WO 2012/103193; WO 2012/0116043; WO 2012/0145313; WO 2012/0145501; WO 2012/145818; WO 2012/145822; WO 2012/158167; WO 2012/075250; WO 2012/0116043; WO 2012/0145501; WO 2012/154919; WO 2013/019707; WO 2013/016409; WO 2013/019795; WO 2013/067083; WO 2013/070539; WO 2013/043661; WO 2013/048994; WO 2013/063014; WO 2013/081984; WO 2013/081985; WO 2013/074604; WO 2013/086249; WO 2013/103548; WO 2013/

109869; WO 2013/123161; WO 2013/126715; WO 2013/043661 and/or WO 2013/158592, and/or U.S. Publication Nos. 2014/0340510; 2014/0313339; 2014/0347486; 2014/0320658; 2014/0336876; 2014/0307095; 2014/0327774; 2014/0327772; 2014/0320636; 2014/0293057; 2014/0309884; 2014/0226012; 2014/0293042; 2014/0218535; 2014/0218535; 2014/0247354; 2014/0247355; 2014/0247352; 2014/0232869; 2014/0211009; 2014/0160276; 2014/0168437; 2014/0168415; 2014/0160291; 2014/0152825; 2014/0139676; 2014/0138140; 2014/0104426; 2014/0098229; 2014/0085472; 2014/0067206; 2014/0049646; 2014/0052340; 2014/0025240; 2014/0028852; 2014/005907; 2013/0314503; 2013/0298866; 2013/0222593; 2013/0300869; 2013/0278769; 2013/0258077; 2013/0258077; 2013/0242099; 2013/0215271; 2013/0141578 and/or 2013/0002873, which are all hereby incorporated herein by reference in their entireties. The system may communicate with other communication systems via any suitable means, such as by utilizing aspects of the systems described in International Publication Nos. WO/2010/144900; WO 2013/043661 and/or WO 2013/081985, and/or U.S. Pat. No. 9,126,525, which are hereby incorporated herein by reference in their entireties.

Optionally, the vision system may include a display for displaying images captured by one or more of the imaging sensors for viewing by the driver of the vehicle while the driver is normally operating the vehicle. Optionally, for example, the vision system may include a video display device, such as by utilizing aspects of the video display systems described in U.S. Pat. Nos. 5,530,240; 6,329,925; 7,855,755; 7,626,749; 7,581,859; 7,446,650; 7,338,177; 7,274,501; 7,255,451; 7,195,381; 7,184,190; 5,668,663; 5,724,187; 6,690,268; 7,370,983; 7,329,013; 7,308,341; 7,289,037; 7,249,860; 7,004,593; 4,546,551; 5,699,044; 4,953,305; 5,576,687; 5,632,092; 5,677,851; 5,708,410; 5,737,226; 5,802,727; 5,878,370; 6,087,953; 6,173,508; 6,222,460; 6,513,252 and/or 6,642,851, and/or U.S. Publication Nos. US-2012-0162427; US-2006-0050018 and/or US-2006-0061008, which are all hereby incorporated herein by reference in their entireties. Optionally, the vision system (utilizing the forward facing camera and a rearward facing camera and other cameras disposed at the vehicle with exterior fields of view) may be part of or may provide a display of a top-down view or birds-eye view system of the vehicle or a surround view at the vehicle, such as by utilizing aspects of the vision systems described in International Publication Nos. WO 2010/099416; WO 2011/028686; WO 2012/075250; WO 2013/019795; WO 2012/075250; WO 2012/145822; WO 2013/081985; WO 2013/086249 and/or WO 2013/109869, and/or U.S. Publication No. US-2012-0162427, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vision system of a vehicle, said vision system comprising:
a camera configured to be disposed at a vehicle so as to have a field of view exterior of the vehicle;
wherein said camera comprises a front housing portion that accommodates a lens thereat;
wherein said camera comprises a circuit element having an imager disposed thereat, and wherein said imager comprises an imaging array having a plurality of photosensing elements arranged in multiple rows and multiple columns of photosensing elements;
wherein one of said front housing portion and said circuit element comprises a protrusion protruding therefrom;
wherein the other of said front housing portion and said circuit element comprises a receiving portion for at least partially receiving said protrusion when said circuit element is positioned at said front housing portion to align said imager with said lens;
wherein, when said circuit element is positioned at said front housing portion to align said imager with said lens, said protrusion is at least partially received at said receiving portion and is adhesively bonded at said receiving portion;
wherein no other part of said front housing portion is attached at said circuit element when said circuit element is positioned at said front housing portion to align said imager with said lens and when said protrusion is at least partially received at said receiving portion and is adhesively bonded at said receiving portion; and
wherein said protrusion and said receiving portion are disposed at one side of said imager when said circuit element is positioned at said front housing portion to align said imager with said lens and when said protrusion is at least partially received at said receiving portion and is adhesively bonded at said receiving portion, and wherein said camera comprises a damper disposed between said circuit element and said front housing portion at a side of said imager generally opposite from said protrusion and said receiving portion.

2. The vision system of claim 1, comprising an image processor operable to process image data captured by said camera, wherein, responsive to processing of captured image data, said image processor is operable to detect objects in the field of view of said camera.

3. The vision system of claim 1, wherein said front housing portion comprises said protrusion protruding therefrom and said circuit element comprises said receiving portion.

4. The vision system of claim 3, wherein said receiving portion comprises a surface of said circuit element that is engaged by said protrusion and adhesively bonded to said protrusion.

5. The vision system of claim 3, wherein said receiving portion comprises an aperture through said circuit element that receives said protrusion at least partially therethrough and that is adhesively bonded to said protrusion via adhesive disposed at and in said aperture.

6. The vision system of claim 1, wherein said protrusion comprises a post having a non-circular cross section and wherein said receiving portion comprises an aperture or recess having a non-circular shape that generally corresponds with the non-circular cross section of said post.

7. The vision system of claim 6, wherein said post comprises a hollow post that has adhesive dispensed therein to hold the adhesive in place before being cured during an alignment process.

8. The vision system of claim 1, wherein said camera comprises a rear housing portion that is mated with said front housing portion to encase said circuit element and said imager.

9. The vision system of claim 8, wherein electrical connectors of said rear housing portion electrically connect to circuitry of said circuit element when said rear housing portion is mated with said front housing portion.

10. The vision system of claim 1, wherein said front housing portion includes a lens holder for holding said lens.

11. A vision system of a vehicle, said vision system comprising:

a camera configured to be disposed at a vehicle so as to have a field of view exterior of the vehicle;

wherein said camera comprises a front housing portion that accommodates a lens thereat;

wherein said camera comprises a circuit element having an imager disposed thereat, and wherein said imager comprises an imaging array having a plurality of photosensing elements arranged in multiple rows and multiple columns of photosensing elements;

wherein said front housing portion comprises a protrusion protruding therefrom;

wherein said circuit element comprises a receiving portion for at least partially receiving said protrusion when said circuit element is positioned at said front housing portion to align said imager with said lens;

wherein, when said circuit element is positioned at said front housing portion to align said imager with said lens, said protrusion is at least partially received at said receiving portion and is adhesively bonded at said receiving portion of said circuit element;

wherein no other part of said front housing portion is attached at said circuit element when said circuit element is positioned at said front housing portion to align said imager with said lens and when said protrusion is at least partially received at said receiving portion and is adhesively bonded at said receiving portion of said circuit element;

wherein said camera comprises a rear housing portion that is mated with said front housing portion to encase said circuit element and said imager, and wherein electrical connectors of said rear housing portion electrically connect to circuitry of said circuit element when said rear housing portion is mated with said front housing portion; and wherein said protrusion and said receiving portion are disposed at one side of said imager when said circuit element is positioned at said front housing portion to align said imager with said lens and when said protrusion is at least partially received at said receiving portion and is adhesively bonded at said receiving portion, and wherein said camera comprises a retention feature comprising (i) a notch at said circuit element at a side of said imager opposite from said protrusion and said receiving portion and (ii) a second protrusion at said front housing portion that engages said notch.

12. The vision system of claim 11, wherein said receiving portion comprises a surface of said circuit element that is engaged by said protrusion and adhesively bonded to said protrusion.

13. The vision system of claim 11, wherein said receiving portion comprises an aperture through said circuit element that receives said protrusion at least partially therethrough and that is adhesively bonded to said protrusion via adhesive disposed at and in said aperture.

14. The vision system of claim 11, wherein said protrusion comprises a post having a non-circular cross section and wherein said receiving portion comprises an aperture or recess having a non-circular shape that generally corresponds with the non-circular cross section of said post.

15. A vision system of a vehicle, said vision system comprising:

a camera configured to be disposed at a vehicle so as to have a field of view exterior of the vehicle;

wherein said camera comprises a front housing portion that accommodates a lens thereat;

wherein said camera comprises a circuit element having an imager disposed thereat, and wherein said imager comprises an imaging array having a plurality of photosensing elements arranged in multiple rows and multiple columns of photosensing elements;

wherein one of said front housing portion and said circuit element comprises a protrusion protruding therefrom;

wherein the other of said front housing portion and said circuit element comprises a receiving portion for at least partially receiving said protrusion when said circuit element is positioned at said front housing portion to align said imager with said lens;

wherein, when said circuit element is positioned at said front housing portion to align said imager with said lens, said protrusion is at least partially received at said receiving portion and is adhesively bonded at said receiving portion;

wherein no other part of said front housing portion is attached at said circuit element when said circuit element is positioned at said front housing portion to align said imager with said lens and when said protrusion is at least partially received at said receiving portion and is adhesively bonded at said receiving portion; and wherein said protrusion and said receiving portion are disposed at one side of said imager when said circuit element is positioned at said front housing portion to align said imager with said lens and when said protrusion is at least partially received at said receiving portion and is adhesively bonded at said receiving portion, and wherein said camera comprises a retention feature comprising (i) a notch at said circuit element at a side of said imager opposite from said protrusion and said receiving portion and (ii) a second protrusion at said front housing portion that engages said notch.

16. A vision system of a vehicle, said vision system comprising:

a camera configured to be disposed at a vehicle so as to have a field of view exterior of the vehicle;

wherein said camera comprises a front housing portion that accommodates a lens thereat;

wherein said camera comprises a printed circuit board having an imager disposed thereat, and wherein said imager comprises an imaging array having a plurality of photosensing elements arranged in multiple rows and multiple columns of photosensing elements;

wherein said front housing portion comprises a protrusion protruding therefrom;

wherein said printed circuit board comprises a receiving portion and wherein said protrusion engages said receiving portion when said printed circuit board is positioned at said front housing portion to align said imager with said lens;

wherein, when said printed circuit board is positioned at said front housing portion to align said imager with said lens, said protrusion engages said receiving portion and is attached to said printed circuit board at said receiving portion;

wherein no other part of said front housing portion is attached at said printed circuit board when said printed circuit board is positioned at said front housing portion to align said imager with said lens and when said protrusion engages said receiving portion and is attached to said printed circuit board;

wherein said camera comprises a rear housing portion that is mated with said front housing portion to encase said printed circuit board and said imager, and wherein electrical connectors of said rear housing portion electrically connect to circuitry of said printed circuit board when said rear housing portion is mated with said front housing portion; and wherein said protrusion and said receiving portion are disposed at one side of said imager when said printed circuit board is positioned at said front housing portion to align said imager with said lens and when said protrusion engages said receiving portion and is attached to said printed circuit board, and wherein said camera comprises a damper disposed between said printed circuit board and said front housing portion at a side of said imager generally opposite from said protrusion and said receiving portion.

17. A vision system of a vehicle, said vision system comprising:

a camera configured to be disposed at a vehicle so as to have a field of view exterior of the vehicle;

wherein said camera comprises a front housing portion that accommodates a lens thereat;

wherein said camera comprises a printed circuit board having an imager disposed thereat, and wherein said imager comprises an imaging array having a plurality of photosensing elements arranged in multiple rows and multiple columns of photosensing elements;

wherein said front housing portion comprises a protrusion protruding therefrom;

wherein said printed circuit board comprises a receiving portion and wherein said protrusion engages said receiving portion when said printed circuit board is positioned at said front housing portion to align said imager with said lens;

wherein, when said printed circuit board is positioned at said front housing portion to align said imager with said lens, said protrusion engages said receiving portion and is attached to said printed circuit board at said receiving portion;

wherein no other part of said front housing portion is attached at said printed circuit board when said printed circuit board is positioned at said front housing portion to align said imager with said lens and when said protrusion engages said receiving portion and is attached to said printed circuit board;

wherein said camera comprises a rear housing portion that is mated with said front housing portion to encase said printed circuit board and said imager, and wherein electrical connectors of said rear housing portion electrically connect to circuitry of said printed circuit board when said rear housing portion is mated with said front housing portion; and wherein said protrusion and said receiving portion are disposed at one side of said imager when said printed circuit board is positioned at said front housing portion to align said imager with said lens and when said protrusion engages said receiving portion and is attached to said printed circuit board, and wherein said camera comprises a retention feature comprising (i) a notch at said printed circuit board at a side of said imager opposite from said protrusion and said receiving portion and (ii) a second protrusion at said front housing portion that engages said notch.

18. The vision system of claim 17, wherein said receiving portion comprises an aperture and wherein a fastener is received through said aperture and into said protrusion to attach said protrusion to said printed circuit board.

* * * * *